(12) United States Patent
Hoedel et al.

(10) Patent No.: US 12,742,493 B2
(45) Date of Patent: Sep. 22, 2026

(54) GEAR TRAIN COMPONENT, PLANETARY GEAR TRAIN, ACTUATING DRIVE, USE AND METHOD FOR PRODUCING AN ACTUATING DRIVE

(71) Applicant: OECHSLER AG, Ansbach (DE)

(72) Inventors: Andreas Hoedel, Herrieden (DE); Georg Engst, Petersaurach (DE); Stefan Dettenberger, Ansbach (DE); Alexander Binder, Herrieden (DE); Andreas Roesel, Nuremberg (DE)

(73) Assignee: OECHSLER AG, Ansbach (DE)

( * ) Notice: Subject to any disclaimer, the term of this patent is extended or adjusted under 35 U.S.C. 154(b) by 0 days.

(21) Appl. No.: 18/795,556

(22) Filed: Aug. 6, 2024

(65) Prior Publication Data

US 2025/0052311 A1 Feb. 13, 2025

(30) Foreign Application Priority Data

Aug. 8, 2023 (DE) ..................... 10 2023 121 040.8

(51) Int. Cl.
*F16H 55/06* (2006.01)
*F16H 1/28* (2006.01)
*F16H 37/04* (2006.01)
*F16H 55/17* (2006.01)

(52) U.S. Cl.
CPC ............. *F16H 55/06* (2013.01); *F16H 37/04* (2013.01)

(58) Field of Classification Search
CPC ........ F16H 55/06; F16H 37/04; F16H 37/041; F16H 2001/289; F16H 57/082; F16H 55/17; F16H 2055/176; F16H 57/02; F16H 57/08
See application file for complete search history.

(56) References Cited

U.S. PATENT DOCUMENTS 4,345,792 A 8/1982 Shephard
4,986,802 A * 1/1991 Scoville ................ F16H 1/2836 475/334
2003/0080599 A1* 5/2003 Hohn .................. B60N 2/2251 475/331
2012/0272525 A1* 11/2012 Basin ...................... B23P 15/14 29/893.1
2014/0125109 A1 5/2014 Schwarzbich

FOREIGN PATENT DOCUMENTS

DE 29814294 U1 11/1998
DE 19963486 A1 7/2001
DE 10106422 A1 8/2002
DE 102005015831 B3 9/2006
EP 1855927 B1 7/2008
GB 2183001 A * 5/1987 ........... F16H 57/082
GB 2555600 A * 5/2018 ............. F16D 51/00
WO WO-9407735 A2 * 4/1994 ........... B62D 43/045

OTHER PUBLICATIONS

German Search Report for corresponding Application No. DE 10 2023 121 040.8, issued Apr. 25, 2024, 6 pages.

* cited by examiner

*Primary Examiner* — Tinh T Dang
(74) *Attorney, Agent, or Firm* — Dority & Manning, P.A.

(57) ABSTRACT

In one aspect, a gear train component for a planetary gear train and/or for a transmission gearing of an actuating drive has at least one gear train element. The at least one gear train element is in the form of a stamped part, such as a fine stamped part, a fine blanked part and/or a precision stamped part.

4 Claims, 3 Drawing Sheets

1
2
3
4
5
6
7
8
9
10
13
14
16
17
18
19
20
21
22
23
24
25
26

GEAR TRAIN COMPONENT, PLANETARY GEAR TRAIN, ACTUATING DRIVE, USE AND METHOD FOR PRODUCING AN ACTUATING DRIVE

CROSS-REFERENCE TO RELATED APPLICATIONS

The present application is based upon and claims the right of priority to German Patent Application No. 10 2023 121 040.8, filed Aug. 8, 2023, the disclosure of which is hereby incorporated by reference herein in its entirety for all purposes.

FIELD OF THE INVENTION

The present subject matter relates to a gear train component for a planetary gear train and/or for a transmission gearing of an actuating drive having at least one gear train element. The present subject matter also relates to a planetary gear train, an actuating drive, a use of a gear train element which is in the form of a stamped part, and to a method for producing an actuating drive.

BACKGROUND OF THE INVENTION

EP 1 855 927 B1 describes a multi-stage planetary gear train for an actuator, or actuating drive. The gear train components of the planetary gear train disclosed in EP 1 855 927 B1 are preferably made of a fiber-reinforced plastic and/or of sintered metal. In particular, the planet gears on the latter planet carrier are made of sintered metal due to the highest achieved torque. Gear train elements made of sintered metal have the disadvantage that, although they can transmit higher torques than gear train elements made of plastic, they also tend to have spontaneous fracture behavior. For this reason, the material thickness in gear train elements made of sintered metal is usually increased, as a result of which the space required by the actuating drive and the weight of the actuating drive increase. Furthermore, gear train elements made of sintered metal have the disadvantage that they usually must be re-worked in a costly and/or energy-intensive manner. In addition, producing gear train elements from sintered metal is energy-intensive, expensive and time-consuming.

Generally, a need exists for gear train components and related gear trains and drives that eliminate the disadvantages known from the prior art.

SUMMARY OF THE INVENTION

In various aspects, the present subject matter is directed to a gear train component, a planetary gear train, an actuating drive, a use and by a method for producing an actuating drive having the features described and claimed herein.

In one aspect, the present subject matter relates to a gear train component for a planetary gear train and/or to a transmission gearing of an actuating drive having at least one gear train element. The actuating drive can be used, for example, for a vehicle component. For example, the actuating drive can be used for electric parking brakes. The gear train element is, for example, a ring gear, a planet gear, a sun gear, a spur gear and/or a planet carrier. By means of the transmission gearing, the rotational motion of the motor can be transmitted and/or stepped-up onto the planetary gear train. The planetary gear train ensures that the rotational motion will continue to be stepped-up, so that the vehicle components, in particular the electric parking brake, can be moved.

According to the present subject matter, the at least one gear train element is in the form of a stamped part. The at least one gear train element is stamped out of a metal sheet by means of a press, in particular by means of a triple-stroke press. Since the at least one gear train element is stamped out of the metal sheet, the gear train element has the material properties of the metal sheet, particularly the homogenous material properties of the metal sheet. Stamped gear train elements therefore have the advantage that they can be produced as cost-effectively as possible and/or have high potential for lightweight construction. Therefore, stamped gear train elements which have a low weight and/or require little space are well suited for transmitting high torques.

Preferably, the gear train element is in the form of a fine stamped part, a fine blanked part and/or a precision stamped part. Fine stamping, or fine blanking, is a non-cutting separation method in which highly precise workpieces, specifically the gear train element in the present case, can be produced. Additionally or alternatively, the gear train element can be simultaneously shaped. In contrast to "normal" stamping, the at least one gear train element is held at the cut contour, in particular at least an outer contour and/or inner contour, preferably using a knife-edged ring, during stamping and/or shaping by means of fine stamping, fine blanking and/or precision stamping. Once the gear train element is held, a punch cuts the at least one gear train element out of the metal. As a result, the at least one gear train element with the at least one highly precise cut edge, in particular at the outer contour and/or inner contour can be produced, or stamped out. Additionally or alternatively, the at least one precision stamped, fine blanked and/or fine stamped gear train element has a high cylindrical cut portion along the sheet thickness. These precise cuts, or cut edge, can be advantageous, in particular in the gear train elements according to the present subject matter, preferably in the region of the at least one toothing.

It is advantageous when the at least one gear train element has at least one stamped outer contour and/or inner contour, wherein the at least one outer contour and/or inner contour preferably has at least one toothing and/or at least one, in particular toothed and/or cam-shaped, securing section. By means of the at least one toothing and/or the at least one securing section, torques can be transmitted between multiple gear train elements and/or other elements of the actuating drive. In particular, by means of the at least one securing section, additionally or alternatively, the at least one gear train element can be supported, in particular in a stationary manner. In this way, it is conceivable that the at least one gear train element is removably supported by means of the at least one securing section on a housing of the actuating drive in a stationary manner and/or a non-displaceable manner and/or along an axis of rotation.

It is also advantageous when the at least one gear train element has a base body, the at least one toothing and/or the at least one securing section preferably being arranged at least in part on the base body.

It is also advantageous when the at least one gear train element is in the form of a one-piece and/or contiguous stamped part. Due to the stamping and/or shaping, complex geometries can also be achieved for the at least one gear train element when working with one-piece stamped parts.

It is also advantageous when the at least one gear train element includes at least one abutting section and/or at least one bearing section, wherein the at least one abutting section and/or the at least one bearing section preferably adjoin the base body.

It is also advantageous when the at least one abutting section and/or the at least one bearing section are/is spaced apart from, or project from, the base body along an axis of rotation of the gear train component, at least in part. The at least one abutting section is preferably in the form of an abutment surface and is spaced apart from the base body along the axis of rotation. The at least one bearing section preferably projects from the base body, in particular due to the shaping.

The at least one gear train element is preferably stamped from the at least one metal sheet and/or shaped preferably as a fine stamped part, a fine blanked part and/or a precision stamped part. During shaping, the at least one abutting section and/or the at least one bearing section can be shaped. As a result, the at least one gear train element having the base body and the abutting section and/or bearing section spaced apart from and/or projecting from the base body can be produced from the at least one metal sheet. The at least one outer contour and/or inner contour can be stamped and/or cut prior to, subsequent to and/or simultaneously with the fine stamping, fine blanking and/or precision cutting.

It is also advantageous when the gear train component includes at least two gear train elements, the at least two gear train elements being abutted against one another, supported against one another and/or, in particular non-displaceably, connected to each other, in particular via the at least one abutting section and/or the at least one bearing section, when the gear train component is used as intended.

In addition, it is advantageous when the at least one toothing and/or the at least one securing section of the at least two gear train elements, which are arranged adjacent to one another and/or are connected to each other when the gear train component is used as intended, are at least partially spaced apart from one another along the axis of rotation and/or correspond with one another.

It is also advantageous when the gear train element is a ring gear, and preferably at least two gear train elements in the form of a ring gear are used to provide a gear train component in the form of a ring gear unit.

It is also advantageous when the at least two gear train elements in the form of ring gears are connected to each other via at least one bearing pin, wherein at least one of the gear train elements preferably has at least one receiving cavity, in particular having at least one receiving opening, for the at least one bearing pin, the receiving cavity being located in the region of the at least one abutting section.

It is also advantageous when the at least one gear train element in the form of a ring gear has the securing section, in particular a cam-shaped securing section, on the outer contour and/or the toothing on the inner contour.

Furthermore, it is advantageous when the at least two gear train elements in the form of ring gears abut one another at respective abutting sections and/or are at least partially spaced apart from one another in the region of the at least one toothing and/or of the at least one securing section along the axis of rotation, in particular by at least a sheet thickness of the gear train element.

It is also advantageous when the gear train element is a planet carrier and/or a planet gear, wherein preferably the at least one planet gear and the at least one planet carrier form at least one gear train component which is in the form of a planet unit.

It is also advantageous when the at least one gear train element in the form of a planet gear is rotatably mounted and/or accommodated on the at least one gear train element in the form of a planet carrier, in particular by means of the at least one bearing section.

It is advantageous when the at least one gear train element in the form of a planet carrier has, on the at least one inner contour, the securing section, in particular a toothed and/or cam-shaped securing section, and/or multiple stamped inner contours.

It is also advantageous when the gear train element is a sun gear and/or a spur gear, wherein preferably at least two gear train elements in the form of a sun gear and/or a spur gear are used to provide a gear train component in the form of a double gear.

It is also advantageous when the at least one gear train element in the form of a planet gear, a sun gear and/or a spur gear has the toothing on the at least one outer contour.

The present subject matter also relates to a planetary gear train for an actuating drive having at least one gear train component. According to the present subject matter, the gear train component is designed according to the preceding description, wherein the aforementioned features can be present individually or in any combination.

It is advantageous when the planetary gear train is in the form of a multi-stage, in particular two-stage, planetary gear train, wherein the multi-stage, in particular two-stage, planetary gear train has at least two planet units, at least two ring gears and/or at least one ring gear unit, in particular having at least two toothing which are spaced apart from one another and/or correspond with one another.

It is also advantageous, when the actuating drive is used as intended, when the two toothing arranged on the inner contour of the respective ring gears and/or of the ring gear unit are in engagement with two gear train elements of different transmission stages of the planetary gear train, the two gear train elements being spaced apart along the axis of rotation and being in the form of planet gears.

It is advantageous, when the actuating drive is used as intended, when the at least one gear train element in the form of a planet carrier has at least one bearing section which is in the form, in particular, of a planet axis for at least one planet gear, and preferably at least one gear train element in the form of a planet gear is, in particular rotatably, accommodated and/or mounted by means of the at least one bearing section of the planet carrier.

It is also advantageous when the multi-stage, in particular two-stage, planetary gear train has at least two planet carriers, each of which has at least one bearing section, and the respective bearing sections of the at least two planet carriers preferably have an identical axle diameter and/or center distance to the axis of rotation.

Additionally or alternatively, the multi-stage, in particular two-stage, planetary gear train has at least two sun gears and/or two planet gears. The outer contour and/or the inner contour of the at least two sun gears and/or of the at least two planet gears are preferably identical. As a result, the production costs can be further reduced, since only one tool, in particular the press having the knife-edged ring and/or the punch, needs to be provided in order to produce identical parts.

The present subject matter further relates to an actuating drive, in particular for a vehicle component, for example, for an electronic parking brake, having a planetary gear train and/or a transmission gearing. According to the present subject matter, the planetary gear train, the transmission gearing and/or the at least one gear train component are/is designed according to the preceding description, wherein the aforementioned features can be present individually or in any combination. The gear train component can be an integral part of the planetary gear train and/or of the transmission gearing.

The present subject matter also relates to a use of a gear train element, which is in the form of a stamped part, in particular a fine stamped part, a fine blanked part and/or a precision stamped part, in a planetary gear train, in a transmission gearing and/or in an actuating drive. According to the present subject matter, the at least one gear train element, the planetary gear train, the transmission gearing and/or the at least one gear train component are/is designed according to the preceding description, wherein the aforementioned features can be present individually or in any combination.

The present subject matter further relates to a method for producing an actuating drive, in particular for a vehicle component. In the method, at least one gear train element of the actuating drive is stamped out of a metal sheet. Preferably, the at least one gear train element, the planetary gear train, the transmission gearing and/or the at least one gear train component are/is designed according to the preceding description, and/or the method has at least one method feature of the preceding description, wherein the aforementioned features can be present individually or in any combination.

The at least one gear train element is preferably at least one of a ring gear, a planet gear, a sun gear, a spur gear and/or a planet carrier. The stamping is preferably carried out as fine stamping, fine blanking and/or precision stamping, for example, by means of a triple-stroke press.

It is advantageous when the at least one gear train element is heat-treated, preferably subsequent to the stamping and/or shaping.

It is also advantageous when at least one outer contour and/or at least one inner contour of the at least one gear train element are/is formed from the metal sheet during stamping, with at least one toothing and/or at least one securing section, in particular a toothed and/or cam-shaped securing section being formed during stamping, preferably in the region of the outer contour and/or the inner contour.

It is also advantageous when the at least one metal sheet is shaped, at least in part, along an axis of rotation prior to, during and/or subsequent to the stamping, in particular during fine stamping, fine blanking and/or precision stamping, for example, by means of the triple-stroke press, so that at least one abutting section and/or at least one bearing section of the at least one gear train element are/is formed.

It is also advantageous when at least two gear train elements are abutted against one another, supported against one another and/or connected to each other, in particular via the at least one abutting section and/or the at least one bearing section, so that at least one gear train component is formed from the at least two gear train elements.

It is also advantageous when at least two gear train elements in the form of ring gears are abutted against one another via the at least one abutting section, preferably via at least two abutting sections which are spaced apart from one another, so that a gear train component in the form of a ring gear unit is provided.

It is also advantageous when at least one gear train element in the form of a planet gear is, in particular rotatably and/or displaceably, accommodated and/or mounted by means of the at least one bearing section of a gear train element in the form of a planet carrier, so that a gear train component in the form of a planet unit is provided.

It is also advantageous when at least two gear train elements in the form of a spur gear and/or a sun gear are abutted against one another and/or positioned concentrically to one another, so that a gear train component in the form of a double gear is provided.

It is advantageous when the at least one gear train element, the at least one planet unit and/or the at least one double gear are/is inserted into the at least one ring gear and/or the at least one ring gear unit, so that preferably a planetary gear train and/or a transmission gearing are/is formed.

It is also advantageous when the at least one gear train element of the at least one gear train component, the at least one planetary gear train, the at least one transmission gearing, at least one motor of the actuating drive and/or at least one fixing element for the motor are/is arranged and/or mounted within one housing, in particular within a housing bottom section of the housing.

BRIEF DESCRIPTION OF THE FIGURES

Further advantages of the invention are described in the following exemplary embodiments, wherein.

DETAILED DESCRIPTION

Figure 1:
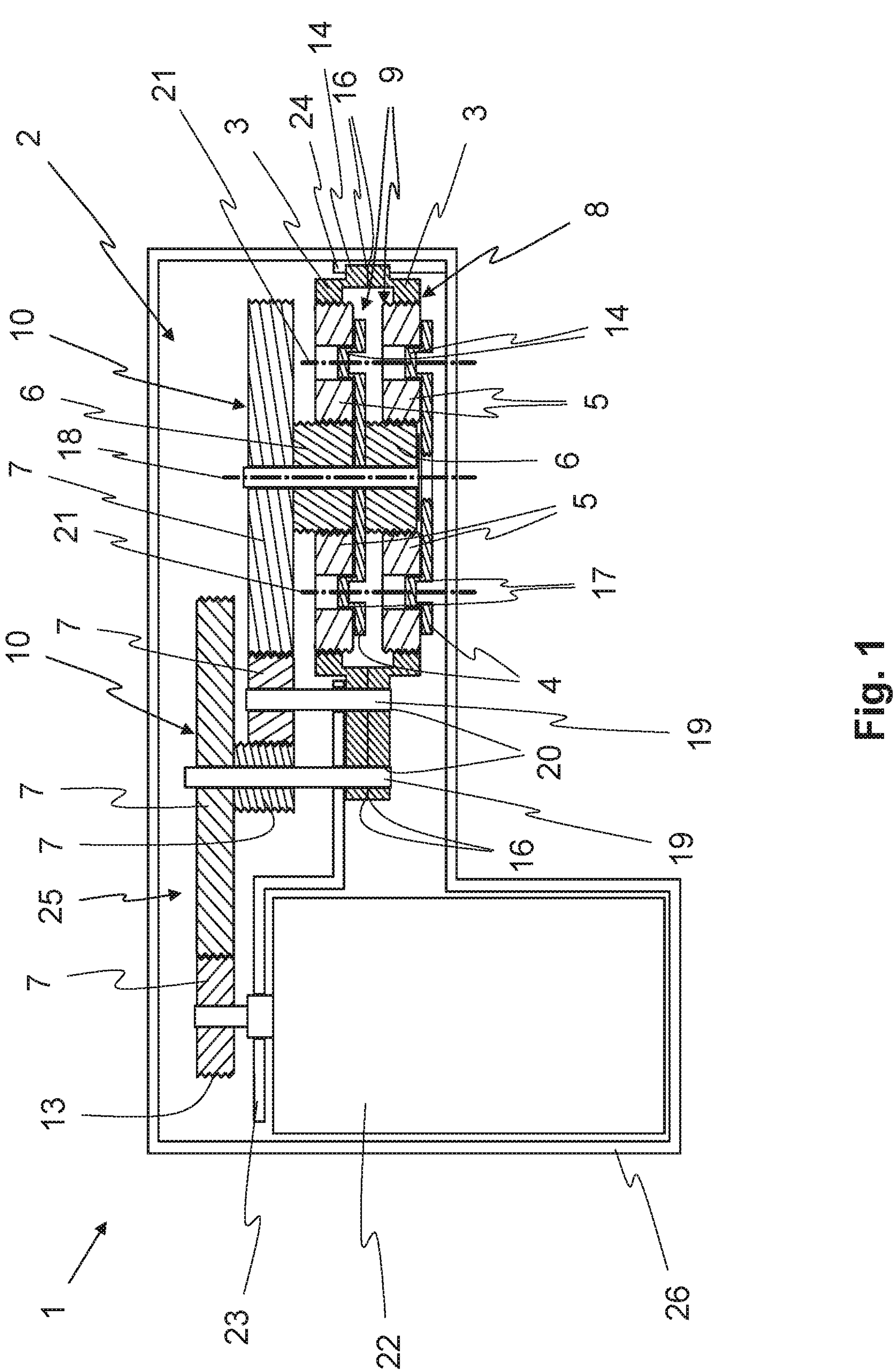
FIG. 1 shows a schematic sectional view of an actuating drive according to one exemplary embodiment.

In the following description of the figures, the same reference characters are used for features that are identical and/or at least comparable in each of the various figures. The individual features, their embodiment and/or mode of operation are explained in detail usually only upon the first mention thereof. If individual features are not explained in detail once more, their embodiment and/or mode of operation correspond(s) to the embodiment and mode of operation of the above-described features having the same function or the same name.

FIG. 1 shows a schematic sectional view of an actuating drive 1 according to one exemplary embodiment. The actuating drive 1 in the exemplary embodiment shown includes a planetary gear train 2, which is in the form of a multi-stage, in particular two-stage, planetary gear train 2 by way of example. The planetary gear train 2 is driven, or set into rotational motion, by means of a motor 22. The rotational motion of the motor 22 is transmitted and/or stepped-up onto the planetary gear train 2 by means of at least one spur gear 7 in the form of gear train elements 3, 4, 5, 6, 7. For this purpose, the actuating drive 1 in the exemplary embodiment shown has a transmission gearing 25 which is formed from multiple spur gears 7.

The actuating drive 1 has multiple gear train elements 3, 4, 5, 6, 7. At least one of the gear train elements 3, 4, 5, 6, 7, in particular several of the gear train elements 3, 4, 5, 6, 7, has/have a toothing 13. The multiple gear train elements 3, 4, 5, 6, 7 are engaged with one another by means of the toothing 13. The reference character for the toothing 13 is shown only for the spur gear 7 on the output shaft of the motor 22 in the exemplary embodiment of FIG. 1, for the sake of clarity. As is apparent in FIG. 1, some of the other gear train elements 3, 4, 5, 6, 7 can also have the toothing 13.

A plurality of gear train elements 3, 4, 5, 6, 7 is shown in the exemplary embodiment of FIG. 1. At least one ring gear 3, at least one planet carrier 4, at least one planet gear 5, at least one sun gear 6 and/or the at least one spur gear 7 are/is shown as gear train elements 3, 4, 5, 6, 7. The exemplary embodiment in FIG. 1 shows multiple spur gears 7, which form the transmission gearing 25. The planetary gear train 2 is also shown in the exemplary embodiment in FIG. 1. The planetary gear train 2 has at least one of the spur gears 7, the at least one ring gear 3, the at least one planet carrier 4, the at least one planet gear 5 and/or the at least one sun gear 6. Since the planetary gear train 2 is in the form of a multi-stage, in particular two-stage, planetary gear train 2, this includes at least two planet carriers 4, at least two planet gears 5 and at least two sun gears 6. In addition, the planetary gear train 2 in the exemplary embodiment shown in FIG. 1 has two ring gears 3.

At least one of the gear train elements 3, 4, 5, 6, 7 is in the form of a stamped part, in particular a fine stamped part, a fine blanked part and/or a precision stamped part. The gear train element 3, 4, 5, 6, 7 in the form of a stamped part is stamped out of a metal sheet. The stamping is carried out usually by means of fine stamping, fine blanking and/or precision stamping. For this purpose, for example, a triple-stroke press is used. In this way, gear train elements 3, 4, 5, 6, 7 that are as exact and/or torque-resistant as possible can be obtained.

In addition, the gear train element 3, 4, 5, 6, 7 in the form of a stamped part can be shaped subsequent to the stamping. In particular, due to the shaping, at least one abutting section 16 and/or at least one bearing section 17 can be formed and/or shaped on the at least one gear train element 3, 4, 5, 6, 7. In the exemplary embodiment shown, the at least one ring gear 3 has the at least one abutting section 16. By means of the at least one abutting section 16, the two ring gears 3 shown can be abutted against one another. The two abutted ring gears 3 from a gear train component 8, 9, 10 in the form of a ring gear unit 8.

The two ring gears 3 can be connected to each other and/or fixed to one another by means of at least one bearing pin 19. The at least one bearing pin 19 is accommodated in at least one receiving cavity 20 in the at least one ring gear 3. In order to connect the two ring gears 3 by means of the at least one bearing pin 19, both ring gears 3 have the receiving cavity 20. The receiving cavity 20 can have, for example, at least one receiving opening. The at least one bearing pin 19 can simultaneously support at least one of the spur gears 7 of the transmission gearing 25.

Additionally or alternatively, a fixing element 23 for the motor 22 can be accommodated by means of the at least one bearing pin 19. By means of the fixing element 23, the motor 22 is fixed to the transmission gearing 25 and/or to the planetary gear train 2. In the exemplary embodiment shown, the actuating drive 1 has multiple bearing pins 19, the fixing element 23 being supported on at least one of the bearing pins 19 without play and/or on the other one of the bearing pins 19 with play. In this way, the distances of the individual spur gears 7 to each other can be held constant. As a result, the wear on the spur gears 7 can be reduced.

In addition, the at least one planet carrier 4 in the exemplary embodiment shown in FIG. 1 includes the at least one bearing section 17. By means of the at least one bearing section 17, at least one planet gear 5, preferably multiple, for example, three or five, planet gears 5 can be accommodated and/or rotatably mounted by means of the at least one planet carrier 4. The at least one planet carrier 4 together with the at least one planet gear 5 forms a gear train component 8, 9, 10 in the form of a planet unit 9.

Additionally or alternatively, the transmission gearing 25 and/or the planetary gear train 2 have/has at least one gear train component 8, 9, 10 in the form of a double gear 10. The at least one double gear 10 includes at least one of the spur gears 7 and/or one of the sun gears 6. The at least one spur gear 7 and/or the at least one sun gear 6 are abutted against one another and connected to each other. In this way, a transmission of the rotational motion from the one gear train element 3, 4, 5, 6, 7 to the gear train element 3, 4, 5, 6, 7 abutting same can be ensured by means of the double gear 10.

The ring gear 3 and/or the ring gear unit 8 of the planetary gear train 2 are/is non-displaceably accommodated in a housing 26 of the actuating drive 1 in the exemplary embodiment shown in FIG. 1. For this purpose, the ring gear 3 and/or the ring gear unit 8 have at least one securing section 14. The securing section 14 corresponds with a supporting section 24 of the housing 26 such that these abut one another when the planetary gear train 2 and/or the actuating drive 1 are/is used as intended. If a rotational motion is generated by means of the motor 22, the at least one spur gear 7, the at least one sun gear 6 and/or the at least one planet unit 9 rotate(s) about an axis of rotation 18 of the planetary gear train 2. In addition, the planet gears 5 rotate about a respective planet axis 21. Since the bearing section 17 has only a limited height, the axle diameter of the bearing sections 17 and/or the center distance of the planet axis 21 to the axis of rotation 18 of the different planet carriers 4, as shown in the exemplary embodiment in FIG. 1, can be identical, or equal.

As described above, the planetary gear train 2 in the exemplary embodiment shown in FIG. 1 is in the form of a multi-stage, in particular two-stage, planetary gear train 2. Therefore, the planetary gear train 2 includes the at least two planet units 9, the at least two ring gears 3 and/or the at least one ring gear unit 8. When the actuating drive 1 is used as intended, the toothing 13 of two planet gears 5, which are spaced apart from one another along the axis of rotation 18, engage into the toothing 13 of the respective ring gears 3 and/or of the ring gear unit 8. Due to the fact that the toothing 13 of the ring gears 3 and/or of the ring gear unit 8 are spaced apart from one another, or the distance between the toothing 13 is in the form of a cavity, a weight reduction of the planetary gear train 2 can be achieved.

Figure 2:
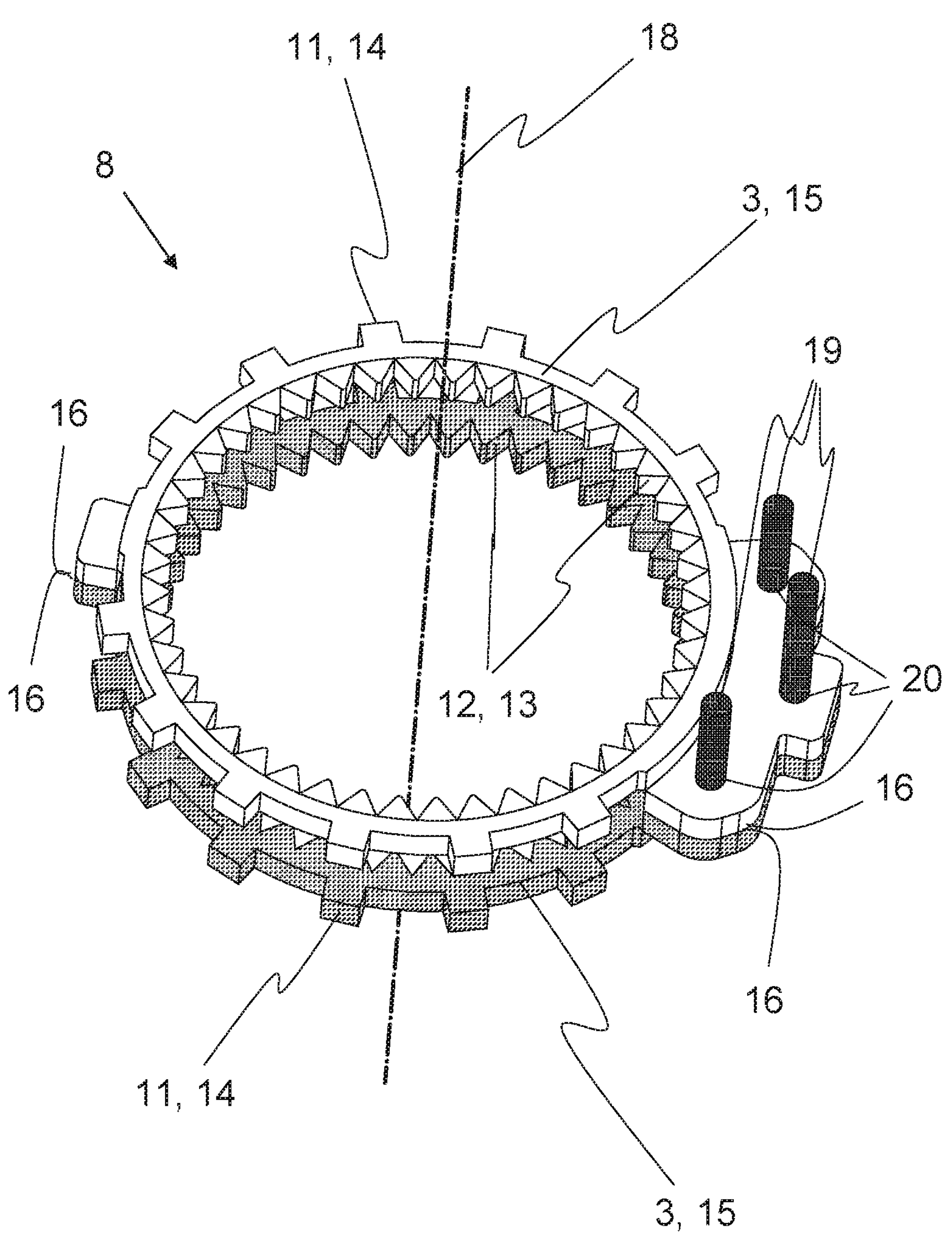
FIG. 2 shows a schematic perspective of a ring gear unit according to one exemplary embodiment.

FIG. 2 shows a schematic perspective of a ring gear unit 8 according to one exemplary embodiment. The ring gear unit 8 is formed from two ring gears 3, similar to the ring gear unit 8 in the exemplary embodiment in FIG. 1. Each of the ring gears 3 is to be considered as a gear train element 3, 4, 5, 6, 7 and/or the ring gear unit 8 is to be considered as a gear train component 8, 9, 10 according to the present subject matter. The gear train element 3, 4, 5, 6, 7 in the form of a ring gear 3 is therefore in the form of a stamped part, in particular a fine stamped part, a fine blanked part and/or a precision stamped part. The further gear train elements 3, 4, 5, 6, 7 and/or gear train components 8, 9, 10 shown in FIG. 1 can be designed and/or produced similarly to the following description of the exemplary embodiments described with reference to FIGS. 2 and 3.

The gear train element 3, 4, 5, 6, 7 is produced from a metal sheet by stamping, in particular fine stamping, fine blanking and/or precision stamping. Therefore, the gear train element 3, 4, 5, 6, 7, namely the at least one ring gear 3 in the exemplary embodiment shown in FIG. 2, has a substantially constant wall thickness. The metal sheet undergoes stamping and/or shaping during stamping along the axis of rotation 18 (shown in FIG. 2) of the planetary gear train 2 (as shown in FIG. 1), which can also be referred to as a stamping axis. Due to the blanking, the at least one gear train element 3, 4, 5, 6, 7 is provided with at least one stamped outer contour 11 and/or at least one stamped inner contour 12. As shown in FIG. 2, in the exemplary embodiment of the ring gear 3 in the form of a gear train element 3, 4, 5, 6, 7, the securing section 14, in particular toothed and/or cam-shaped securing section 14, is arranged on the outer contour 11 and the toothing 13 is arranged on the inner contour 12.

Thereafter and/or subsequent to the blanking, the gear train element 3, 4, 5, 6, 7 can be shaped, in particular with fine stamping, fine blanking and/or precision stamping. As a result, a base body 15 of the gear train element 3, 4, 5, 6, 7, in particular of the ring gear 3, can be formed. The at least one abutting section 16 and/or the at least one bearing section 17 are/is spaced apart from and/or projects from the base body 15 along the axis of rotation 18. If the two abutting sections 16 of the at least two gear train elements 3, 4, 5, 6, 7 in the form of ring gears 3 abut one another, the respective base bodies 15, in particular with the toothing 13 arranged thereon at least in part and/or with the securing section 14, can be spaced apart from one another along the axis of rotation 18.

Since the planet gears 5 of the planetary gear train 2 shown in the exemplary embodiment in FIG. 1 are also spaced apart from one another along the axis of rotation 18, the toothing 13 of the ring gear unit 8 and/or of the two ring gears 3 can also be spaced apart from one another. Due to this spacing, unnecessary material can be saved, as a result of which the resultant actuating drive 1 has a lighter weight. In addition, the sheet thickness can be considerably reduced due to the homogeneous material behavior of the metal sheet in comparison to gear train elements 3, 4, 5, 6, 7 made of sintered metal from the prior art. As a result, in addition to or as an alternative to the lighter weight, the at least one gear train component 8, 9, 10 can also require less space.

Figure 3:
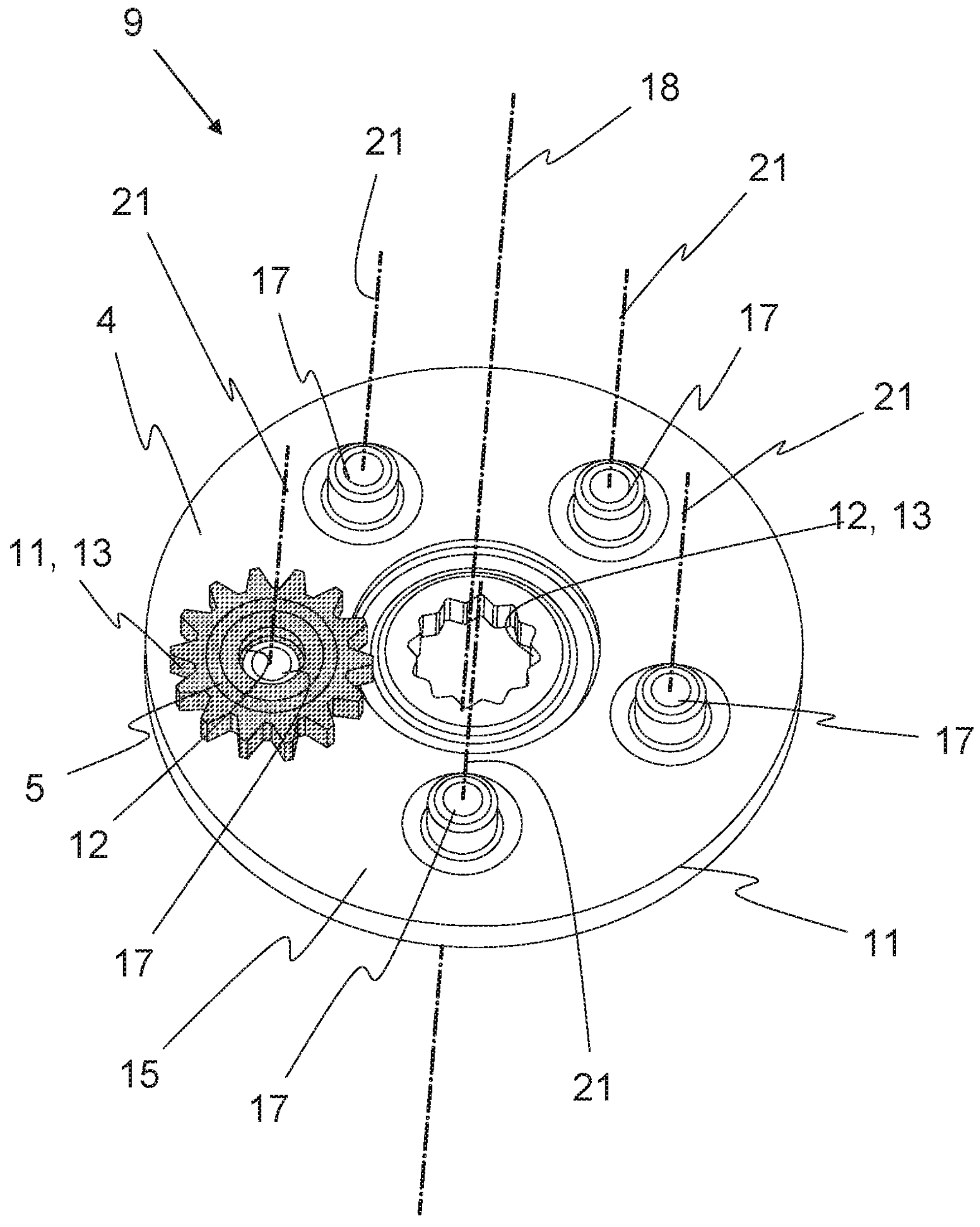
FIG. 3 shows a schematic perspective of a planet unit according to one exemplary embodiment.

FIG. 3 shows a schematic perspective of a planet unit 9 according to one exemplary embodiment. The planet unit 9 in FIG. 3 is designed similarly to the planet units 9 in the exemplary embodiment in FIG. 1. The planet unit 9 includes the planet carrier 4 and the at least one planet gear 5. By way of example, the gear train element 3, 4, 5, 6, 7 in the form of a planet carrier 4 has five bearing sections 17 for five planet gears 5. It is also conceivable that the planet carrier 4 has more or fewer bearing sections 17, for example, only three bearing sections 17. For the sake of clarity, only one of the planet gears 5 is accommodated by the planet carrier 4, or is supported by means of the at least one bearing section 17.

The planet carrier 4 and/or the planet gear 5 shown in the exemplary embodiment in FIG. 3 are/is also in the form of a stamped-out gear train element 3, 4, 5, 6, 7, i.e., a stamped part. The respective at least one inner contour 12 and/or the at least one outer contour 11 are/is stamped out and/or the gear train element 3, 4, 5, 6, 7, in particular the planet carrier 4, is shaped. The gear train element 3, 4, 5, 6, 7 in the form of a planet carrier 4 includes the at least one bearing section 17, which adjoins the base body 15 and/or projects therefrom at least in part. The gear train element 3, 4, 5, 6, 7 in the form of a planet carrier 4 has the toothing 13 on the inner contour 12. The gear train element 3, 4, 5, 6, 7 in the form of a planet gear 5 has the toothing 13 on its outer contour 11.

If the planet unit 9 and the ring gear unit 8, or the ring gear 3 as shown in FIG. 2, are used in the actuating drive 1 as shown in FIG. 1, the toothing 13 of the at least one planet gear 5 engages into the toothing 13 of the at least one ring gear 3 of the ring gear unit 8.

As described above, further and/or alternative gear train elements 3, 4, 5, 6, 7 and/or gear train components 8, 9, 10 of the actuating drive 1, in particular of the transmission gearing 25 and/or of the planetary gear train 2, as shown in FIG. 1 can also be produced as a stamped part.

LIST OF REFERENCE CHARACTERS

1 actuating drive
2 planetary gear train
3 ring gear
4 planet carrier
5 planet gear
6 sun gear
7 spur gear
8 ring gear unit
9 planet unit
10 double gear
11 outer contour
12 inner contour
13 toothing
14 securing section
15 base body
16 abutting section
17 bearing section
18 axis of rotation
19 bearing pin
20 receiving cavity
21 planet axis
22 motor
23 fixing element
24 supporting section
25 transmission gearing
26 housing

The invention claimed is:

1. A gear train component for a planetary gear train and/or for a transmission gearing of an actuating drive, the gear train component comprising:
- at least two gear train elements in the form of a stamped part,
- wherein each of the at least two gear train elements is in the form of a ring gear,
- wherein the at least two gear train elements together form a ring gear unit,
- wherein the at least two gear train elements are connected to each other via at least one bearing pin, and
- wherein at least one of the at least two gear train elements has at least one receiving cavity for receiving the at least one bearing pin in a region of at least one abutting section of the at least one of the at least two gear train elements.

2. A planetary gear train for an actuating drive having at least one gear train component, wherein the at least one gear train component is configured according to claim 1.

3. The planetary gear train of claim 2, wherein
- the at least one gear train component comprises first and second ring gears and first and second planet gears;
- toothing arranged on an inner contour of the first and second ring gears are in engagement with the first and second planet gears, respectively; and
- the first and second ring gears are spaced apart along an axis of rotation of the planetary gear train.

4. An actuating drive, comprising:
- a planetary gear train and/or a transmission gearing,
- wherein the planetary gear train and/or the transmission gearing includes at least one gear train component configured according to claim 1.

* * * * *